(12) United States Patent
Kuwamoto et al.

(10) Patent No.: US 9,566,984 B2
(45) Date of Patent: Feb. 14, 2017

(54) CONTROL APPARATUS FOR HYBRID VEHICLE AND CONTROL METHOD THEREFOR

(71) Applicant: TOYOTA JIDOSHA KABUSHIKI KAISHA, Toyota-shi, Aichi-ken (JP)

(72) Inventors: Hiroki Kuwamoto, Toyota (JP); Akira Nakata, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/786,076

(22) PCT Filed: Apr. 22, 2014

(86) PCT No.: PCT/IB2014/000586
§ 371 (c)(1),
(2) Date: Oct. 21, 2015

(87) PCT Pub. No.: WO2014/174355
PCT Pub. Date: Oct. 30, 2014

(65) Prior Publication Data
US 2016/0059863 A1    Mar. 3, 2016

(30) Foreign Application Priority Data

Apr. 23, 2013  (JP) ................ 2013-090361

(51) Int. Cl.
*B60W 30/20*  (2006.01)
*B60W 20/00*  (2016.01)
(Continued)

(52) U.S. Cl.
CPC ............. *B60W 30/20* (2013.01); *B60K 6/445* (2013.01); *B60W 10/06* (2013.01); *B60W 10/08* (2013.01);
(Continued)

(58) Field of Classification Search
CPC ...... B60W 30/20; B60W 10/06; B60W 20/00; B60W 10/08; B60W 2710/083; B60W 2510/0695; B60W 2510/0685; B60W 2510/084; B60K 6/445; Y10S 903/903; Y02T 10/6286; Y02T 10/6239
(Continued)

(56) References Cited

U.S. PATENT DOCUMENTS 6,131,680 A  10/2000 Nii et al.
2010/0241297 A1  9/2010 Aoki et al.

FOREIGN PATENT DOCUMENTS

JP    H09-308012 A   11/1997
JP    2001-136605 A   5/2001
(Continued)

*Primary Examiner* — Brian P Sweeney
(74) *Attorney, Agent, or Firm* — Oliff PLC (57) ABSTRACT

A control apparatus for a vehicle including: an internal combustion engine that generates a driving force; and a motor connected to the internal combustion engine via an elastic body to allow torque transmission, wherein the control apparatus performs a specific control that controls a rotational speed of the internal combustion engine by a generated torque of the motor, and the control apparatus performs a control so that, even when the strength of the generated torque accompanied with releasing elastic energy accumulated in the elastic body in the specific control is required to be changed, the strength is not changed when an absolute value of a torque change ratio which is the amount of change per unit time is larger than a predetermined change ratio threshold and an absolute value of the elastic energy is larger than a predetermined elastic energy threshold.

6 Claims, 10 Drawing Sheets (51) Int. Cl.
    *B60W 10/06*           (2006.01)
    *B60W 10/08*           (2006.01)
    *B60K 6/445*            (2007.10)

(52) U.S. Cl.
    CPC ...... *B60W 20/00* (2013.01); *B60W 2510/0685* (2013.01); *B60W 2510/0695* (2013.01); *B60W 2510/084* (2013.01); *B60W 2710/083* (2013.01); *Y02T 10/6239* (2013.01); *Y02T 10/6286* (2013.01); *Y10S 903/903* (2013.01)

(58) Field of Classification Search
    USPC .......................................................... 701/22
    See application file for complete search history.

(56) References Cited

FOREIGN PATENT DOCUMENTS

| | | |
|---|---|---|
| JP | 2006-070985 A | 3/2006 |
| JP | 2009-126450 A | 6/2009 |
| JP | 2009-274627 A | 11/2009 |

| CRANK ANGLE CA | 0° | 30° | 60° | 90° | 120° | 150° |
|---|---|---|---|---|---|---|
| ELASTIC ENERGY Ek | e1 | e2 | e3 | e4 | e5 | e6 |

FIG. 4A

TORQUE CHANGE OF FIRST MOTOR

FIG. 4B

CHANGE OF ROTATIONAL SPEED OF INTERNAL COMBUSTION ENGINE

| ABSOLUTE VALUE $|\Delta T1|$ OF DIFFERENCE $\Delta T1$ | ta1 | ta2 | ta3 | ta4 | ta5 | ta6 |
|---|---|---|---|---|---|---|
| ELASTIC ENERGY THRESHOLD Ekref | er1 | er2 | er3 | er4 | er5 | er6 | wherein, ta1<ta2<ta3<ta4<ta5<ta6 and
er1>er2>er3>er4>er5>er6

FIG.8

| MOTOR ANGLE MA=15° | | | | | | | |
|---|---|---|---|---|---|---|---|
| MOTOR ANGLE MA=10° | | | | | | | |
| MOTOR ANGLE MA=5° | | | | | | | |
| MOTOR ANGLE MA=0° | | | | | | | |
| CRANK ANGLE CA | 0° | 30° | 60° | 90° | 120° | 150° |
| ELASTIC ENERGY Ek | e01 | e02 | e03 | e04 | e05 | e06 |

| LUBRICATION OIL TEMPERATURE THO | −30°C | 0°C | 30°C | 60°C | 90°C | 120°C |
|---|---|---|---|---|---|---|
| UPPER LIMIT ANGLE CAmax | ca1 | ca2 | ca3 | ca4 | ca5 | ca6 |
| LOWER LIMIT ANGLE CAmin | ci1 | ci2 | ci3 | ci4 | ci5 | ci6 |

CONTROL APPARATUS FOR HYBRID VEHICLE AND CONTROL METHOD THEREFOR

BACKGROUND OF THE INVENTION

1. Field of the Invention

The present invention relates to a control apparatus for a hybrid vehicle including an internal combustion engine and a motor and a control method therefor.

2. Description of Related Art

A hybrid vehicle having both an internal combustion engine and a motor for vehicle driving (hereinafter, simply referred to as "vehicle") has been known. The vehicle has a power dividing mechanism such as a planetary gear train in order to combine a torque generated by the internal combustion engine and a torque generated by the motor to transmit the combined torque to an axle. In order to absorb fluctuation of a torque generated on a crankshaft of the internal combustion engine, a torsional damper in which two shafts provided on both ends are connected via an elastic body (hereinafter, simply referred to as "damper") is interposed between the internal combustion engine and the power dividing mechanism.

In a vibration suppression apparatus of a drive unit (hybrid drive unit) disclosed in Japanese Patent Application Publication No. 2001-136605 (JP 2001-136605 A), since a torque fluctuation caused by intermittent explosive combustion of an internal combustion engine is transmitted to a motor with a predetermined delay due to elastic deformation of a damper. Accordingly, in order to offset this torque fluctuation, the motor generates a periodically fluctuating torque.

Incidentally, generally a control apparatus of a vehicle selectively performs, based on a driving situation of a vehicle, the residual amount of a battery SOC (State of Charge) and the like, an engine driving mode for driving only by a torque generated by an internal combustion engine, a motor driving mode for driving only by a torque generated by a motor while the internal combustion engine is stopped and a motor assist mode for driving by a torque of both the internal combustion engine and the motor. That is, during the driving of the vehicle, the control apparatus appropriately switches actuation and stopping relating to an operation state of the internal combustion engine.

This control apparatus stops fuel injection when it moves the operation state of the internal combustion engine from actuation to stopping. At this time, in order to avoid vibration and/or occurrence of a noise due to reduction of the rotational speed of the internal combustion engine, the control apparatus needs to set the rotational speed of the internal combustion engine to "0" in a short time. Accordingly, the control apparatus allows the motor to generate "a torque in the direction that stops the rotation of the internal combustion engine" (hereinafter, referred to as "inhibition torque").

In a vehicle (hybrid vehicle) disclosed in Japanese Patent Application Publication No. 2009-274627 (JP 2009-274627 A), when an internal combustion engine is stopped, a motor generates an inhibition torque. After that, the vehicle performs the control that the speed of reducing the inhibition torque, that is, a change ratio of the inhibition torque is once decreased to prevent the occurrence of shock due to twist of a damper during a process of reducing the inhibition torque.

SUMMARY OF THE INVENTION

Incidentally, when a motor generates an inhibition torque and the torque is transmitted to an internal combustion engine via a damper, the damper is twisted to accumulate elastic energy. When the inhibition torque is reduced in a state that the damper is twisted, at least one of both shafts provided for the damper rotates in the direction that releases the twist of the damper. Due to this rotation, free vibration in which the damper is rotatably vibrated with its inherent frequency is excited.

The larger the amount of twist to be released is, the larger the amplitude of this free vibration becomes. When the amplitude of the free vibration is large, vibration of the vehicle and a noise caused by backlash between parts of a transmission mechanism such as a power dividing mechanism can occur. The amount of twist to be released has a positive correlation with a change ratio which is the amount of change of the torque per unit time when the inhibition torque is reduced and elastic energy accumulated in the damper at the time when the inhibition torque is reduced.

In other words, in order to prevent the occurrence of the vibration and a noise, the control apparatus needs to make the change ratio of a torque of the motor and the amount of elastic energy accumulated in the damper below a predetermined amount when it reduces the inhibition torque. However, in the conventional vehicle described above, the change ratio of a torque and the amount of elastic energy when the inhibition torque is reduced has not been considered.

On the other hand, free vibration of the damper can be excited also when, for example, the motor performs cranking to generate "a torque in the direction that rotates the internal combustion engine" in the opposite direction from that of the inhibition torque and thereafter the torque is reduced. In this way, as the case that free vibration of the damper can be excited, not limited to the case where rotation of the internal combustion engine is stopped, various cases can be assumed, for example, the case where the rotation of the internal combustion engine is started, the case where the rotational speed of the internal combustion engine is decreased and the case where the rotational speed of the internal combustion engine is increased.

The present invention provides a control apparatus for a vehicle that, when an absolute value of the magnitude of a torque transmitted from the motor to the internal combustion engine via the damper is reduced, its reduction ratio and the amount of elastic energy at that time are considered to inhibit vibration generated on the damper and a control method therefor.

A control apparatus for a vehicle according to an aspect of the present invention including: an internal combustion engine that generates a driving force; and a motor connected to the internal combustion engine via an elastic body to allow torque transmission, wherein the control apparatus performs a specific control that controls a rotational speed of the internal combustion engine by a generated torque of the motor.

Further, the control apparatus performs a control so that, even when a strength of the generated torque accompanied with releasing elastic energy accumulated in the elastic body in the specific control is required to be changed, the strength is not changed when an absolute value of a torque change ratio which is the amount of change per unit time is larger than a predetermined change ratio threshold and an absolute value of the elastic energy is larger than a predetermined elastic energy threshold.

According to this aspect, if elastic energy accumulated in the damper (elastic body) is larger than a predetermined threshold, the torque change is postponed, and the torque change is executed at the timing that the elastic energy is lowered. As a result, the occurrence of the subsequent damper vibration is inhibited, and vibration of the vehicle and the occurrence of a noise which could be generated accompanied with the vibration can be avoided.

This aspect is applied to, for example, the case where the inhibition torque is reduced. In other words, the specific control is a control that lowers a rotational speed of the internal combustion engine by the generated toque of the motor, and the change may be a change that reduces the generated torque.

According to this configuration, when the control apparatus allows the motor to generate the inhibition torque and then reduces the inhibition torque, the occurrence of damper vibration can be inhibited.

Incidentally, when an internal combustion engine is a four-cycle engine, combustion occurs in a specific cylinder once in two turns of a crankshaft. For example, if a four-cylinder engine is used, combustion occurs in any one of cylinders while the crankshaft is rotated by 180°. Due to the combustion in the cylinder, a force that presses a piston is generated, and that force is converted to a torque to rotate the crankshaft. Accordingly, the torque becomes the maximum after a predetermined period elapsed from the occurrence of combustion. That is, the torque generated by this internal combustion engine fluctuates with a cycle of a period that the crankshaft is rotated by 180°. As a result, elastic energy to be accumulated in the damper can be fluctuated due to the fluctuation of the generated torque of the internal combustion engine.

In addition, for example, when the operation state of the internal combustion engine is moved from operation to stoppage, the internal combustion engine stops fuel injection. In this case, since compression and expansion of the air of the cylinder by the piston are alternatively repeated, the torque that acts on the crankshaft fluctuates with a cycle of a period that the crankshaft is rotated by 180°. As a result, elastic energy to be accumulated in the damper can be fluctuated depending on the crank angle.

Consequently, in this aspect, the control apparatus may estimate the elastic energy based on the crank angle of the internal combustion engine.

On the other hand, a torque generated by the motor can fluctuate periodically by cogging etc. Consequently, in this aspect, the control apparatus may estimate the elastic energy based on the motor angle of the motor. In other words, the control apparatus can estimate the elastic energy based on the crank angle of the internal combustion engine and/or the motor angle of the motor.

According to the above configuration, the control apparatus can correctly estimate the amount of elastic energy which is changed with the elapse of time during the rotation of the internal combustion engine. As a result, the control apparatus can determine with high precision as to whether a torque change of the motor is performed.

Incidentally, as described above, the larger an absolute value of a change ratio of the torque of the motor is, the larger a change of the amount of twist of the damper accompanied therewith becomes. If the change of the amount of twist of the damper is large, the amplitude of damper vibration caused after the torque change can be large. As a result, there is a possibility that vibration of the vehicle and the occurrence of a noise accompanied with the vibration of the damper become large. In other words, when the absolute value of a torque change ratio is small, the amplitude can be small even when damper vibration occurs, and accordingly, the vibration of the vehicle and/or the occurrence of a noise can be avoided even when the control apparatus sets the elastic energy threshold to a large value.

Consequently, in this aspect, the elastic energy threshold may be set to decrease as the absolute value of the torque change ratio increases.

According to the above configuration, the control apparatus can avoid the situation that torque change is not performed by setting an elastic energy threshold to a large value in a case where an absolute value of a change ratio of the torque is small and there is little possibility of causing damper vibration. As a result, the control apparatus can inhibit the delay of initiation of a torque change to the minimum.

Additionally, the present invention relates to a vehicle that mounts this control apparatus and further, to a method used in the control apparatus.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
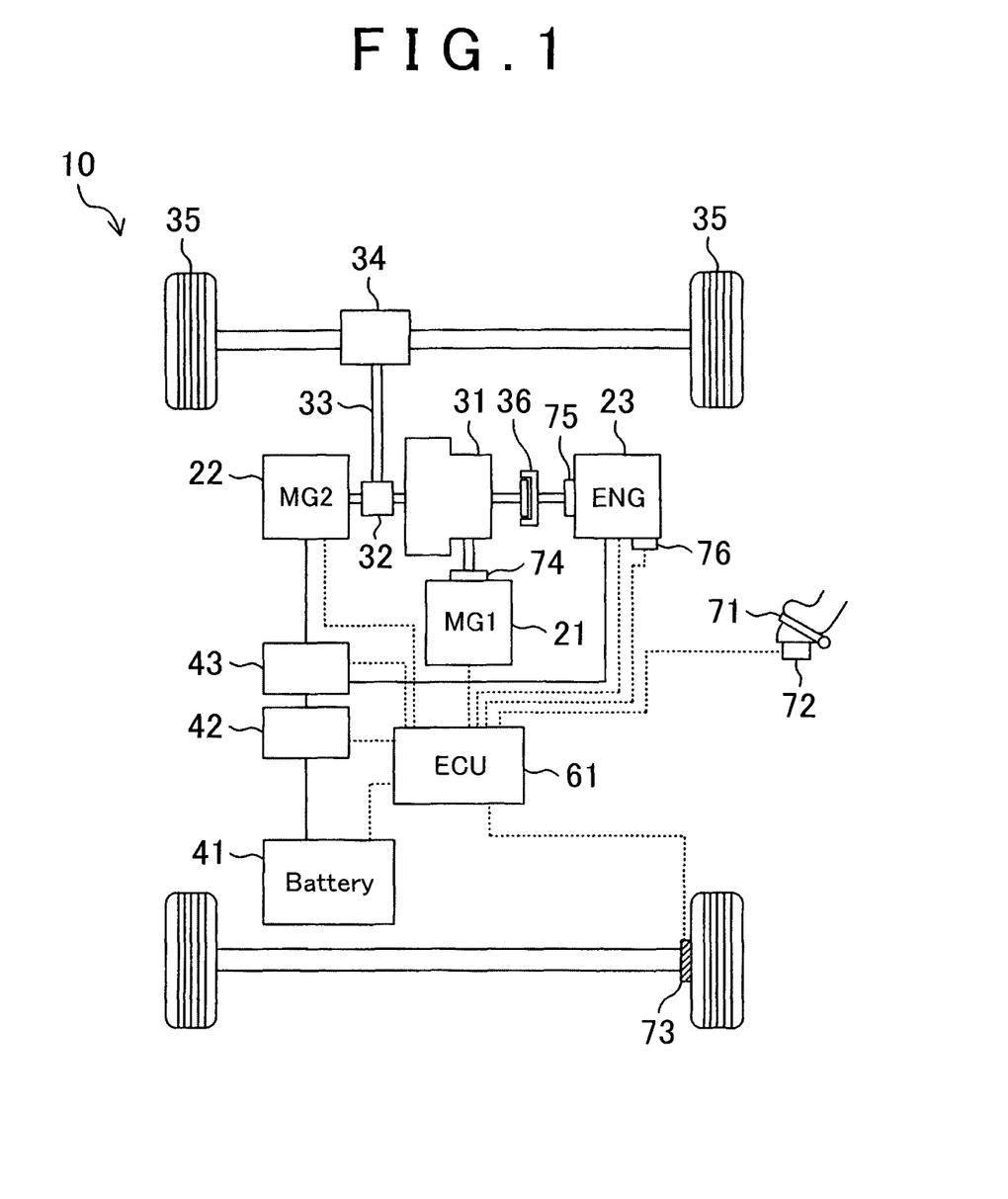
FIG. 1 is a schematic configuration diagram of a vehicle to which a control apparatus (first apparatus) according to the first embodiment of the present invention is applied.

Hereinafter, a control apparatus of an internal combustion engine according to an embodiment of the present invention will be explained with reference to the drawings. FIG. 1 is an outline drawing that shows a schematic configuration of a vehicle 10 to which the control apparatus according to the present invention is applied. The vehicle 10 includes a first motor 21, a second motor 22 and an internal combustion engine 23. That is, the vehicle 10 is a hybrid vehicle.

Each of the first motor 21 and the second motor 22 includes a stator including a three-phase winding (coil) that generates a rotating magnetic field and a rotor including a permanent magnet that generates a torque due to a magnetic force between the rotating magnetic field and the permanent magnet. Each of the first motor 21 and the second motor 22 can be operated not only as a motor but also as a generator.

The first motor 21 is mainly used as a generator. The first motor 21 further performs cranking of the internal combustion engine 23 at the time of activation of the internal combustion engine 23 and generates "an inhibition torque whose direction is opposite from the rotational direction of the internal combustion engine 23" to promptly stop the rotation of the internal combustion engine 23 at the time of stoppage of the internal combustion engine 23. As the cranking and the occurrence of the inhibition torque, generating "a torque that acts to the internal combustion engine 23" by the first motor 21 is referred to as "motoring."

The second motor 22 is mainly used as a motor and can generate a vehicle driving force (a torque allowing the vehicle to drive) of the vehicle 10. The internal combustion engine 23 also can generate a vehicle driving force of the vehicle 10. The internal combustion engine 23 is four-cylinder four-cycle (stroke) gasoline engine.

The vehicle 10 includes a power dividing mechanism 31. The power dividing mechanism 31 is a planetary gear train. That is, the power dividing mechanism 31 includes a not shown sun gear, a not shown ring gear disposed concentrically with the sun gear, a plurality of not shown pinion gears that engage with the sun gear and also engage with the ring gear and a not shown pinion carrier that retains the plurality of pinion gears rotatably as well as revolutionably around the sun gear.

To the sun gear, an output shaft of the first motor 21 is connected to allow torque transmission. To the pinion carrier, a crankshaft of the internal combustion engine 23 is connected to allow torque transmission. To the ring gear, an output shaft of the second motor 22 is connected to allow torque transmission via a speed reduction mechanism 32. Further, the output shaft of the second motor 22 is connected to an axle 33 to allow torque transmission via the speed reduction mechanism 32. The axle 33 is connected to a drive wheel 35 to allow torque transmission via a differential gear 34.

A torsional damper 36 is interposed between the internal combustion engine 23 and the power dividing mechanism 31. The torsional damper 36 connects a shaft on the side of the internal combustion engine 23 to a shaft on the side of the power dividing mechanism 31 so that each shaft is rotatable via an elastic body to absorb fluctuation of a torque generated by the internal combustion engine 23.

The vehicle 10 further includes a battery 41, a boost converter 42 and an inverter 43. The battery 41 is a charge-discharge secondary battery (in this embodiment, a lithium-ion battery). A DC power outputted from the battery 41 is subjected to voltage conversion (pressure rising) by the boost converter 42. The DC power subjected to voltage conversion is converted into an AC power by the inverter 43 and supplied to the first motor 21 and the second motor 22.

On the other hand, when the first motor 21 and/or the second motor 22 operate as a generator, an AC power generated by them is converted into a DC power by the inverter 43. Further, the converted DC power is subjected to voltage conversion (pressure lowering) by the boost converter 42 and supplied to the battery 41. As a result, the battery 41 is charged. Alternatively, the AC power generated by the first motor 21 is supplied to the second motor 22 via the inverter 43. The boost converter 42 and the inverter 43 are controlled by a control apparatus 61 which will be described later.

The control apparatus 61 includes a plurality of electronic control units (ECU) that controls the vehicle 10. That is, the control apparatus 61 includes, for example, an MG-ECU that controls the first motor 21 and the second motor 22, an engine-ECU that controls the internal combustion engine 23, a battery-ECU that monitors the battery 41 and the like. Each electronic control unit is a microcomputer that includes a CPU and a memory etc., and executes each program. Each electronic control unit exchanges information to each other through a communication line.

The control apparatus 61 selectively performs an engine driving mode to drive the vehicle 10 only by a torque generated by the internal combustion engine 23, a motor driving mode to drive the vehicle 10 only by a torque generated by the second motor 22 while the internal combustion engine 23 is stopped and a motor assist mode to drive the vehicle 10 by a torque of both the internal combustion engine 23 and the second motor 22. The control apparatus 61 stops the operation of the internal combustion engine 23 when the operation state of the internal combustion engine 23 moves from the activation to the stoppage, for example, from the engine driving mode or the motor assist mode to the motor driving mode.

The control apparatus 61 obtains the amount of pressing Ap of an accelerator pedal 71 from an accelerator operation amount sensor 72 attached to the accelerator pedal 71. The control apparatus 61 obtains the driving speed Vs of the vehicle 10 from a vehicle speed sensor 73 attached to the axle. The control apparatus 61 obtains the motor angle MA of the first motor 21 from a resolver 74 attached to the first motor 21. The control apparatus 61 obtains the crank angle CA and the rotational speed NE of the internal combustion engine 23 from a crank angle sensor 75 attached to the internal combustion engine 23. In this embodiment, the crank angle CA is expressed as an angle of a specific cylinder (for example, the first cylinder) of the internal combustion engine 23 after the compression top dead center. The control apparatus 61 obtains the lubrication oil temperature THO of the internal combustion engine 23 from a lubrication oil temperature sensor 76 attached to the internal combustion engine 23.

Figure 2:
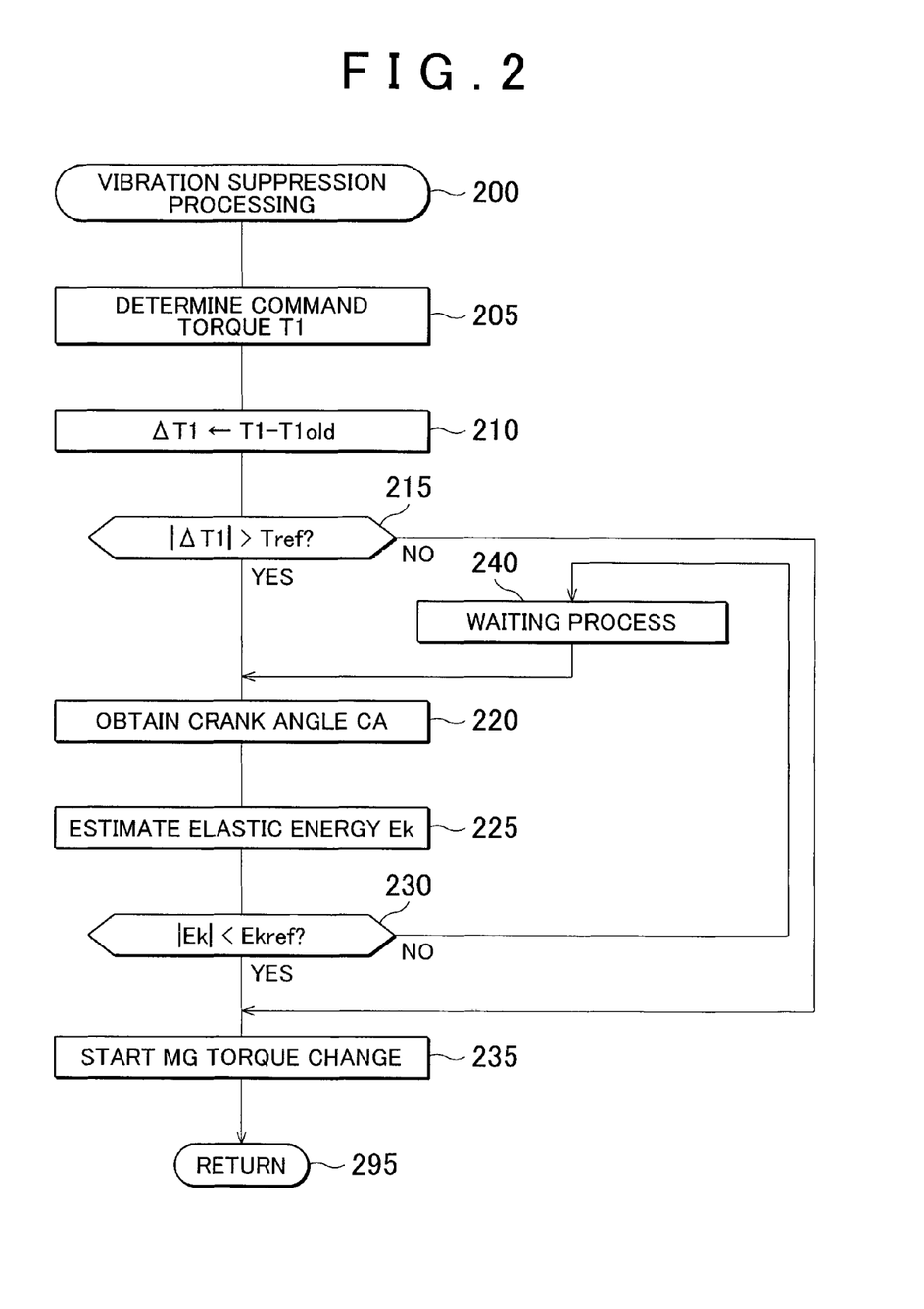
FIG. 2 is a flow chart that explains the processing executed by the first apparatus.

Next, the operation of the control apparatus 61 will be explained. With reference to FIG. 2, a processing of inhibiting the occurrence of "damper vibration which is a cause of vibration of the vehicle 10 and/or the occurrence of a noise" caused by fluctuation of the generated torque of the first motor 21 executed by the CPU of the control apparatus 61 (hereinafter, simply referred to as "CPU"), that is, a vibration suppression processing will be explained. The CPU starts the processing from step 200 for each predetermined elapsed time and goes to step 205.

In step 205, the CPU determines a requested torque Tr and a requested output Pr based on the amount of pressing Ap of the accelerator pedal 71 and the driving speed Vs of the vehicle 10. The CPU further determines the amount of charge request G1 of the first motor 21, a command torque T2 of the second motor 22 and a command torque Te of the internal combustion engine 23 and moreover, necessity of motoring by the first motor 21 and a command torque T1 of the first motor 21 required for motoring if the motoring is necessary. The drive control of the first motor 21, the second motor 22 and the internal combustion engine 23 as described above is disclosed in detail, for example, in Japanese Patent Application Publication No. 2009-126450 (JP 2009-126450 A) (US 2010/0241297 A) and Japanese Patent Application Publication No. 9-308012 (JP 9-308012 A) (U.S. Pat. No.

6,131,680 with the U.S. application date of Mar. 10, 1997) etc. These documents are incorporated herein by reference in its entirety.

Next, the CPU goes to step 210 to calculate the difference ΔT1 (=T1−T1old) between the command torque T1 of the first motor 21 determined in step 205 and a command T1old of the first motor 21 determined when this routine has been previously executed. The difference ΔT1 represents the amount of change of the command torque T1 to "the time from the determination of the command torque T1old to the determination of the current command torque T1." That is, an absolute value of the difference ΔT1 has a correlation with a torque change ratio which is the amount of change per unit time of the generated torque of the first motor 21.

Next, the CPU goes to step 215 to determine whether an absolute value of the difference ΔT1 (|ΔT1|) is larger than a predetermined difference threshold Tref. If the absolute value of the difference ΔT1 is the difference threshold Tref or less, there is no risk of the occurrence of "vibration which is a cause of vibration of the vehicle 10 and/or the occurrence of a noise" in the torsional damper 36. In this case, the CPU determines as "No" in step 215 and goes to step 235. Additionally, the difference threshold Tref is previously obtained by an experiment etc., and retained in a memory of the control apparatus 61.

In step 235, the CPU controls the first motor 21 so that it generates the command torque T1. Additionally, there is a possibility that the value of the command torque T1 is "0." After that, the CPU goes to step 295 to once terminate this routine.

On the other hand, if the absolute value of the difference ΔT1 is larger than the difference threshold Tref, due to the fluctuation of the torque of the first motor 21, the vibration as described above could be generated in the torsional damper 36. In this case, the CPU determines as "Yes" in step 215 and goes to step 220.

In step 220, the CPU obtains the crank angle CA based on the output of the crank angle sensor 75.

Next, the CPU goes to step 225 to estimate an elastic energy Ek accumulated in the torsional damper 36 based on the crank angle CA. More concretely, since the internal combustion engine 23 is not only a four-cycle engine but a four-cylinder engine, during the operation of the internal combustion engine 23, combustion occurs in any one of cylinders until the crank angle CA is changed by 180°. After that, a piston is pressed down due to expansion of air-fuel mixture in the cylinder, which generates a torque to rotate a crankshaft. At this time, the generated torque in the internal combustion engine 23 is maximized, and then the torque is reduced. On the other hand, in a case where the CPU stops the fuel injection of the internal combustion engine 23 to execute the motor driving mode, since compression and expansion of the air in the cylinders by the piston are alternatively repeated, the torque acting to the crankshaft fluctuates with a cycle of "a period in which the crank angle CA is changed by 180°." That is, the torque acting to the crankshaft of the internal combustion engine 23 fluctuates with a cycle of the period in which the crank angle CA is changed by 180° irrespective of the operation of the internal combustion engine 23.

Figure 3:
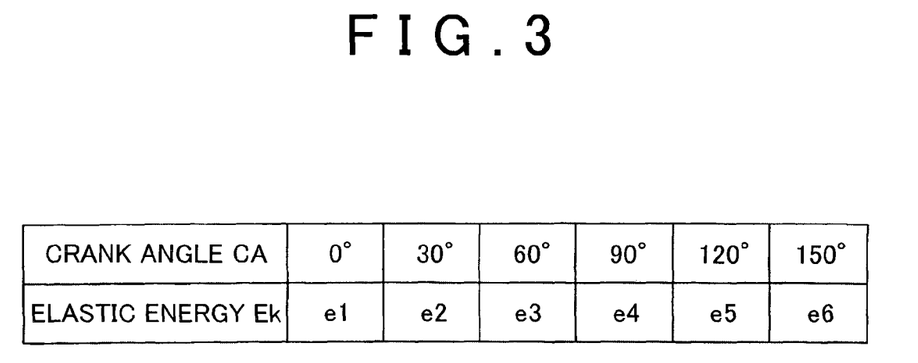
FIG. 3 is a map that the first apparatus refers to in order to obtain the amount of elastic energy based on the crank angle of an internal combustion engine.

When the generated torque of the internal combustion engine 23 is increased, the amount of twist of the torsional damper 36 is raised to increase the elastic energy Ek. On the other hand, when the generated torque of the internal combustion engine 23 is reduced, the amount of twist of the torsional damper 36 is reduced to lower the elastic energy Ek. Consequently, the elastic energy Ek fluctuates with the same cycle as that of the fluctuation of the torque of the internal combustion engine 23. As shown in FIG. 3, the control apparatus 61 retains a map describing the elastic energy Ek to each crank angle CA on the memory. This map is previously obtained by an experiment and the like. The CPU obtains a value of the elastic energy Ek to the crank angle CA with reference to this map.

Next, the CPU goes to step 230 to determine as to whether an absolute value |Ek| of the elastic energy Ek is smaller, than a predetermined elastic energy threshold Ekref. If the absolute value |Ek| is the elastic energy threshold Ekref or more, "vibration which is a cause of vibration of the vehicle 10 and/or the occurrence of a noise" could occur in the torsional damper 36. In this case, the CPU determines as "No" in step 230 and goes to step 240. Additionally, the elastic energy threshold Ekref is previously obtained by an experiment etc. and retained on the memory of the control apparatus 61.

In step 240, the CPU maintains the torque of the first motor 21 in a predetermined period without any change. After that, the CPU goes to step 220 and obtains the crank angle CA again. That is, the CPU postpones the control such that the first motor 21 generates the command torque T1 until the elastic energy Ek is smaller than the elastic energy threshold Ekref.

On the other hand, if the absolute value |Ek| of the elastic energy Ek is smaller than the elastic energy threshold Ekref, there is no risk of generating the vibration described above in the torsional damper 36. In this case, the CPU determines as "Yes" in step 230 and goes to step 235.

Figure 4A:
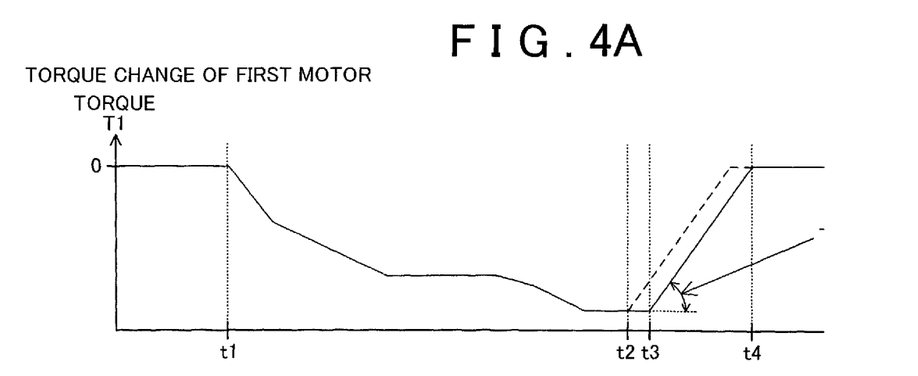
FIG. 4 is a timing chart that explains the processing to reduce an inhibition torque executed by the first apparatus.
Figure 4B:
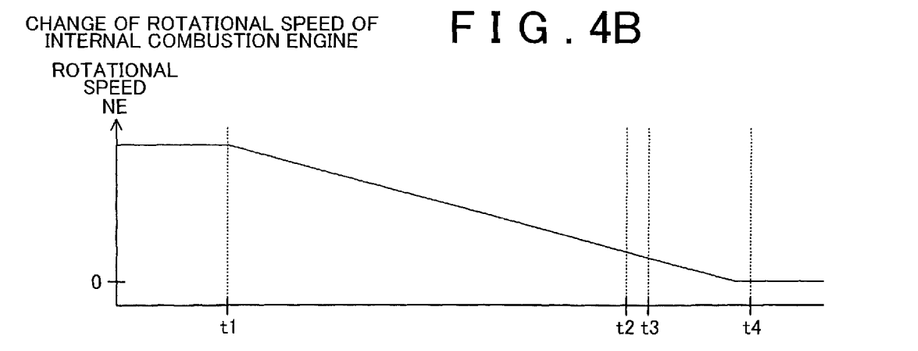

Next, FIG. 4 shows an example of a timing chart when a mode executed by CPU is moved from the engine driving mode or the motor assist mode to the motor driving mode. FIG. 4A shows an inhibition torque generated by the first motor 21, and FIG. 4B shows the rotational speed NE of the internal combustion engine 23.

Time t1 is the time when the internal combustion engine 23 stops the operation accompanied with the moving from the engine driving mode or the motor assist mode to the motor driving mode. At this time, the first motor 21 generates a torque in the direction to stop the rotation of the internal combustion engine 23, that is, a negative torque. In this case, the CPU adjusts the strength of an inhibition torque to prevent a rapid change to a torque occurring on the axle 33. Due to the inhibition torque, the rotational speed NE is rapidly dropped compared with the case that no inhibition torque occurs.

Time t2 is the time when the first motor 21 is scheduled to start reducing the inhibition torque (the time when the strength of the generated torque of the first motor 21 accompanied with releasing of the elastic energy. Ek is requested to be changed). However, the CPU postpones reducing the inhibition torque since it performs the vibration suppression control shown in FIG. 2 to determine that the elastic energy Ek is larger than the elastic energy threshold Ekref at the time t2 (determines as "No" in step 230) (step 240).

Additionally, the gradient from time t3 to time t4 of a graph of FIG. 4A (oblique solid line) represents the torque change ratio which is the amount of reduction of an absolute value of the generated torque per unit time. In this embodiment, since this gradient is larger (gradient is steep) than that of a graph corresponding to the differential threshold Tref, it is determined as "Yes" in step 215 of FIG. 2.

After that, at the time t3 when the elastic energy Ek is smaller than the elastic energy threshold Ekref, the CPU performs the control such that the first motor 21 reduces the inhibition torque. The time t4 is the time when the generated torque of the first motor 21 becomes "0." The rotational speed NE has already become "0" at the time t4.

As explained above, the control apparatus 61 according to the first embodiment can be applied to a vehicle (vehicle 10) that mounts an internal combustion engine (internal combustion engine 23) that generates a vehicle driving force (torque which is equal to the command torque Te) and a motor (first motor 21) connected to the internal combustion engine via an elastic body (torsional damper 36) to allow torque transmission, and performs a specific control to control the rotational speed of the internal combustion engine by the generated torque of the motor (torque which is equal to the command torque T1).

Further, the control apparatus 61 is configured such that, even when the strength of the generated torque accompanied with releasing elastic energy (elastic energy Ek) accumulated in the elastic body in the specific control is required to be changed (step 205 of FIG. 2 and the time t2 in FIG. 4), the strength is not changed (step 240 of FIG. 2) if an absolute value ($|\Delta T1|$) of a torque change ratio which is the amount of change per unit time is larger than a predetermined change ratio threshold (difference threshold Tref) and an absolute value of the elastic energy is larger than a predetermined elastic energy threshold (elastic energy threshold Ekref) (steps 215 and 230 of FIG. 2).

Further, the control apparatus 61 performs a specific control that lowers the rotational speed of the internal combustion engine by the generated torque of the motor (A and B of FIG. 4) to cause a change of reducing the generated torque (time t2 or after of FIG. 4A).

Further, the control apparatus 61 estimates the elastic energy based on the crank angle (crank angle CA) of the internal combustion engine (step 225 of FIG. 2 and FIG. 3).

According to this control apparatus 61, the occurrence of vibration of the torsional damper 36 due to the torque fluctuation of the first motor 21 can be suppressed. As a result, vibration of the vehicle 10 and/or the occurrence of a noise can be avoided.

Next, a control apparatus 62 according to the second embodiment of the present invention will be explained. In the control apparatus 61 according to the first embodiment, the elastic energy threshold Ekref is a fixed value. In contrast, the control apparatus 62 is different from the control apparatus 61 only in that an elastic energy threshold Ekref has a negative correlation with the difference $\Delta T1$. That is, the CPU of the control apparatus 62 (hereinafter, simply referred to as "CPU") is configured such that, the larger an absolute value $|\Delta T1|$ of the difference $\Delta T1$ is, the smaller the elastic energy threshold Ekref is.

Hereinafter, with reference to a flowchart shown in FIG. 5 regarding the operation of the control apparatus 62, mainly the difference from the flowchart shown in FIG. 2 will be explained. In each step of the flowchart of FIG. 5, when the same processing as in FIG. 2 is performed, the same reference numeral for step as in FIG. 2 is assigned. The CPU starts the processing from step 500 for each predetermined elapsed time and goes to step 205.

The CPU goes to step 526 after the processing of step 225. In step 526, the CPU determines an elastic energy threshold Ekref to an absolute value $|\Delta T1|$ of the difference $\Delta T1$ with reference to a map retained on a memory of the control apparatus 62 as shown in FIG. 6. This map is previously obtained by an experiment etc. Additionally, the larger the absolute value IOTA of the difference $\Delta T1$ is, the smaller a value of the elastic energy threshold Ekref described in this map is. Next, the CPU goes to the processing of step 230.

Figure 5:
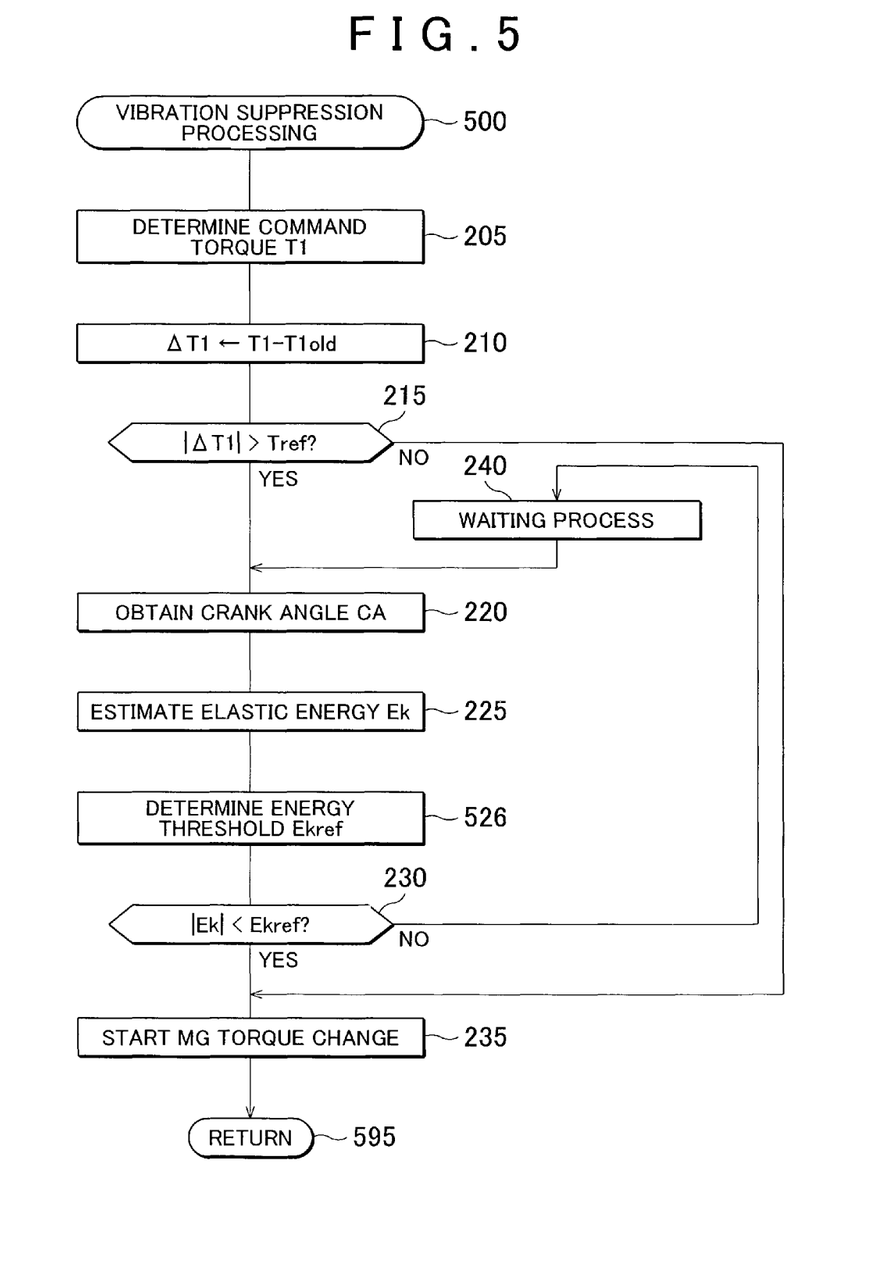
FIG. 5 is a flow chart that explains the processing executed by a control apparatus (second apparatus) according to the second embodiment of the present invention.
Figure 6:
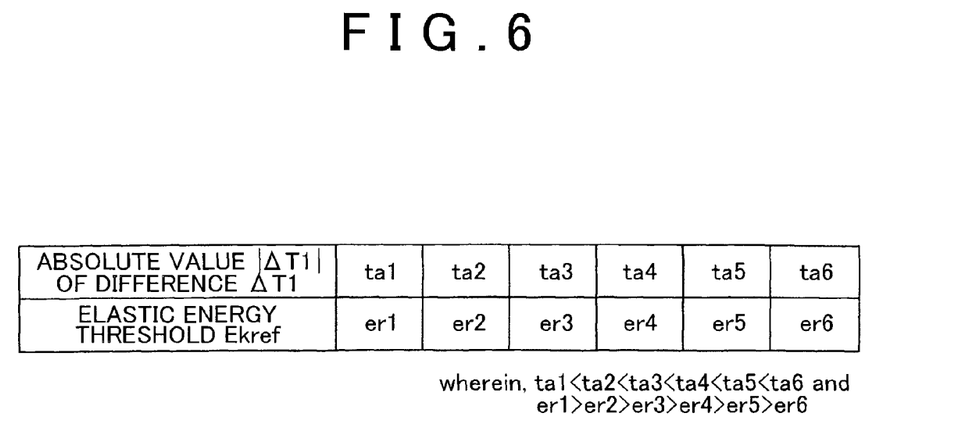
FIG. 6 is a map that the second apparatus refers to in order to obtain an elastic energy threshold based in the amount of change of a torque of the internal combustion engine.

As explained above, the control apparatus 62 according to the second embodiment is configured such that, in addition to the processing executed by the control apparatus 61 according to the first embodiment, the larger an absolute value of the torque change ratio (absolute value $|\Delta T1|$ of the difference $\Delta T1$) is, the smaller a value of the elastic energy threshold (elastic energy threshold Ekref) is (step 526 of FIG. 5 and FIG. 6).

According to the control apparatus 62, when an absolute value of the torque change ratio is small and the possibility of occurrence of vibration of the damper is low, the elastic energy threshold is set as large to avoid the state that no torque change is performed (execution of step 240). As a result, the control apparatus 62 not only avoids vibration of the vehicle 10 and/or the occurrence of a noise but suppresses the delay of initiation of a torque change to the minimum.

Next, a control apparatus 63 according to the third embodiment of the present invention will be explained. The control apparatus 61 according to the first embodiment estimates elastic energy Ek based on the crank angle CA. In contrast, the control apparatus 63 is different from the control apparatus 61 only in that it estimates elastic energy Ek based on the crank angle CA as well as the motor angle MA.

Figure 7:
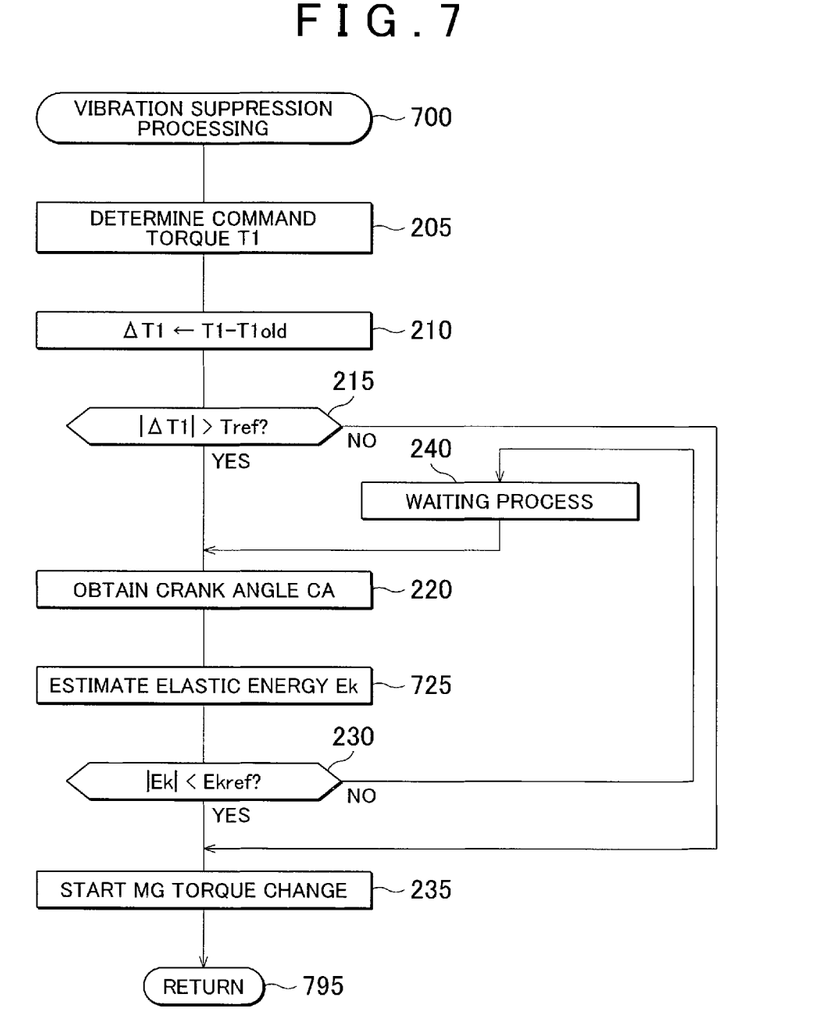
FIG. 7 is a flow chart that explains the processing executed by a control apparatus (third apparatus) according to the third embodiment of the present invention.

Hereinafter, with reference to a flowchart shown in FIG. 7 regarding the operation of the control apparatus 63, mainly the difference from the flowchart shown in FIG. 2 will be explained. In each step of the flowchart of FIG. 7, when the same processing as in FIG. 2 is performed, the same reference numeral for step as in FIG. 2 is assigned. The CPU of the control apparatus 63 (hereinafter, simply referred to as "CPU") starts the processing from step 700 for each predetermined elapsed time and goes to step 205.

The CPU goes to step 725 after the processing of step 220. In step 725, the CPU estimates elastic energy Ek accumulated in the torsional damper 36 based on the crank angle CA as well as the motor angle MA. More concretely, the torque generated by the internal combustion engine 23 fluctuates with a cycle of a period that the crank angle CA is changed by 180° as described above.

Figure 8:
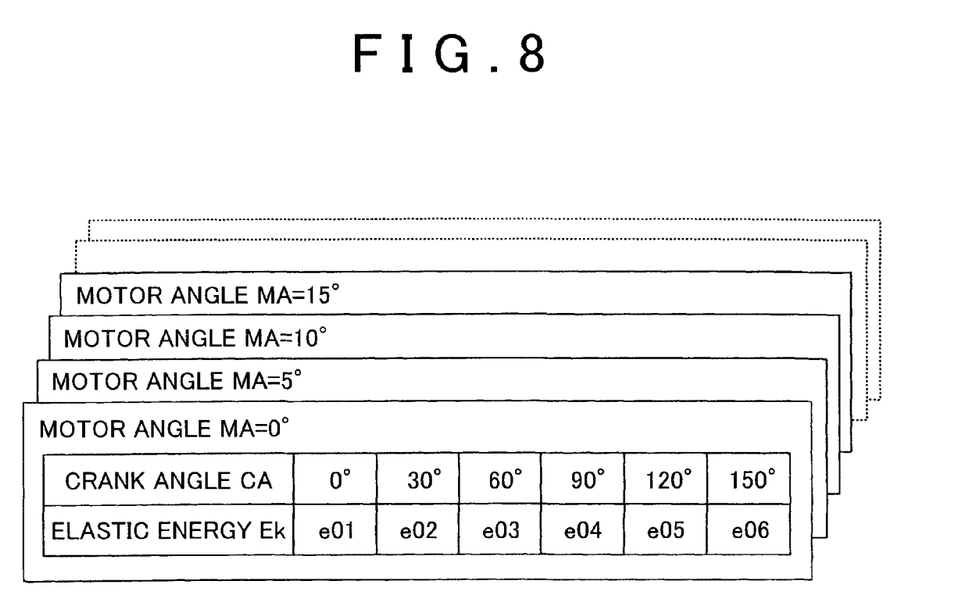
FIG. 8 is a map that the third apparatus refers to in order to obtain the amount of elastic energy based on the crank angle of the internal combustion engine and the motor angle.

On the other hand, a torque generated by the first motor 21 can be fluctuated by cogging etc. Consequently, as shown in FIG. 8, the CPU refers to a map in which the elastic energy Ek to each crank angle CA is described for each motor angle MA. This map is previously obtained by an experiment etc., and retained on a memory of the control apparatus 63. The CPU obtains a value of elastic energy Ek to the crank angle CA with reference to this map. Next, the CPU proceeds to the processing of step 230.

According to the control apparatus 63, by considering cogging of the first motor 21 in addition to the crank angle CA of the internal combustion engine 23, the vibration suppression control with higher precision can be performed. As a result, vibration of the vehicle 10 and/or the occurrence of a noise can be avoided, and the delay of execution of a torque change of the first motor 21 can be suppressed to the minimum.

Next, a control apparatus 64 according to the fourth embodiment of the present invention will be explained. The control apparatus 61 according to the first embodiment estimates elastic energy Ek based on the crank angle CA to determine the necessity of a torque change of the first motor 21. In contrast, the control apparatus 64 is different from the control apparatus 61 only in that it determines the necessity of a torque change based on the crank angle CA of the internal combustion engine 23 and the lubrication oil temperature THO.

The crank angle CA having an elastic energy Ek which is higher than an elastic energy threshold Ekref exists in a specific range. Consequently, if the lower limit crank angle CAmin and the upper limit crank angle CAmax in this range are obtained, the CPU of the control apparatus 64 (hereinafter, simply referred to as "CPU") can determine the necessity of a torque change of the first motor 21 by comparing these angles and the crank angle CA. That is, when the crank angle CA is smaller than the lower limit crank angle CAmin or when the crank angle CA is larger than the upper limit crank angle CAmax, the CPU determines that a generated toque of the first motor 21 may be changed.

Figure 10:
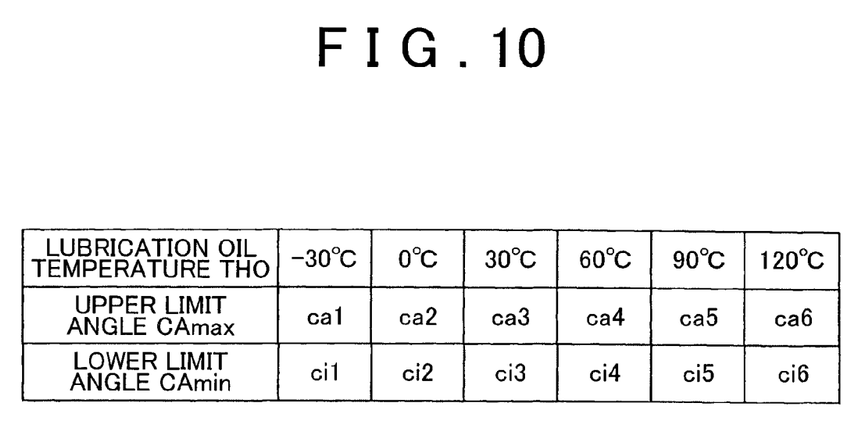
FIG. 10 is a map that the fourth apparatus refers to in order to obtain the scope of the crank angle allowing a torque change based on the lubrication oil temperature of the internal combustion engine.

In addition, the lower limit crank angle CAmin and the upper limit crank angle CAmax have a correlation with the lubrication oil temperature THO. Accordingly, the CPU refers to a map as shown in FIG. 10 in which the lower limit crank angle CAmin and the upper limit crank angle CAmax are described for each lubrication oil temperature THO. This map is previously obtained by an experiment etc., and retained on a memory of the control apparatus 64.

Figure 9:
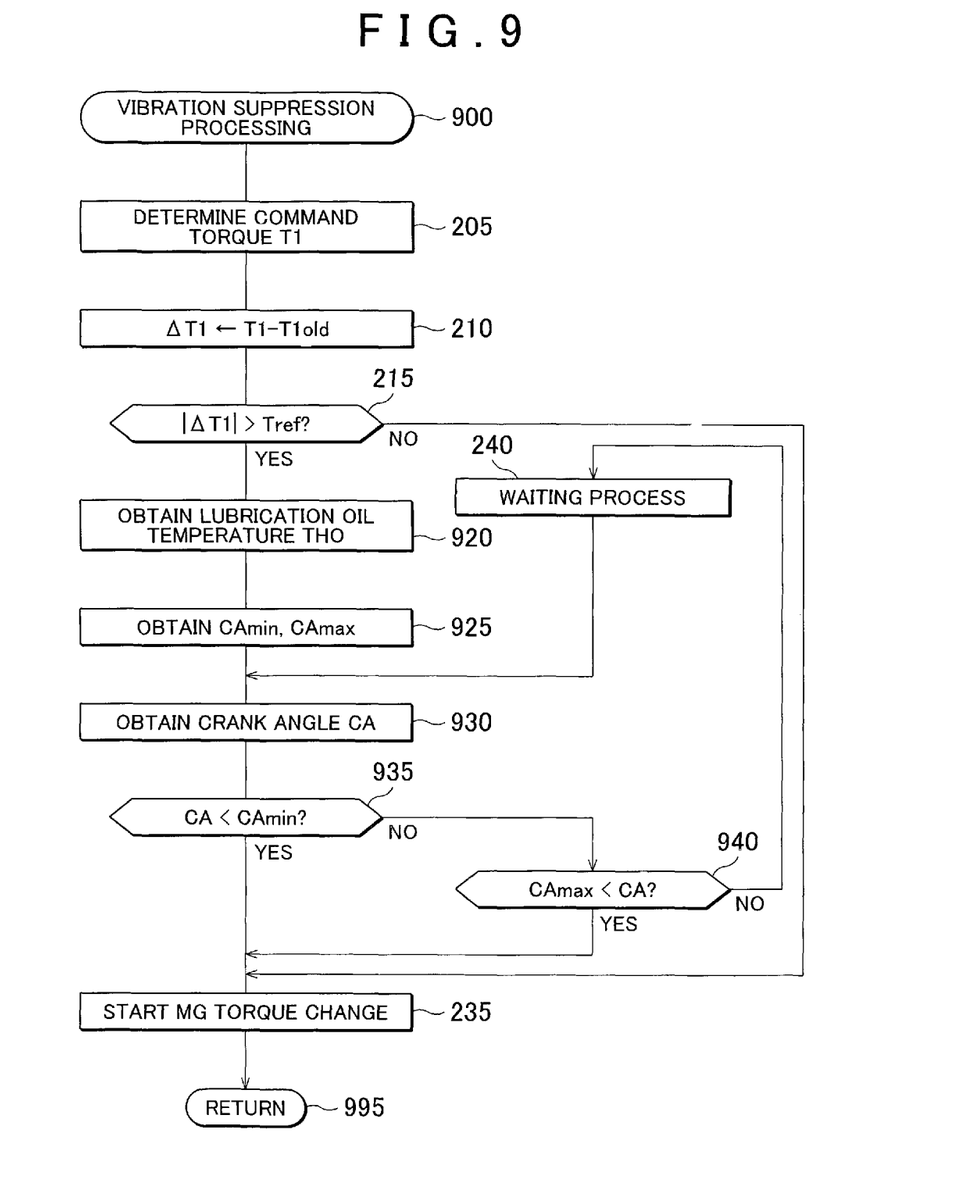
FIG. 9 is a flow chart that explains the processing executed by a control apparatus (fourth apparatus) according to the fourth embodiment of the present invention.

Hereinafter, with reference to a flowchart shown in FIG. 9 regarding the operation of the control apparatus 64, mainly the difference from the flowchart shown in FIG. 2 will be explained. In each step of the flowchart of FIG. 9, when the same process as in FIG. 2 is performed, the same reference numeral for step is assigned. The CPU starts the processing from step 900 for each predetermined elapsed time and goes to step 205.

The CPU goes to step 920 when it determines as "Yes" in step 215. In step 920, the CPU obtains the lubrication oil temperature THO based on an output from the lubrication oil temperature sensor 76. Next, the CPU goes to step 925 to obtain the lower limit crank angle CAmin and the upper limit crank angle CAmax to the lubrication oil temperature THO with reference to the map shown in FIG. 10 as described above.

Next, the CPU goes to step 930 to obtain the crank angle CA based on an output from the crank angle sensor 75 by the same processing as step 220 in FIG. 2. After that, the CPU goes to step 935. Additionally, after the processing of step 240 is performed, the CPU goes to step 930.

In step 935, the CPU determines as to whether the crank angle CA is smaller than the lower limit crank angle CAmin. If the crank angle CA is smaller than the lower limit crank angle CAmin, as described above, the elastic energy Ek is lower than the elastic energy threshold Ekref. In this case, the CPU determines as "Yes" in step 935 and goes to step 235.

On the other hand, if the crank angle CA is the crank angle CAmin or more, there is a possibility that the elastic energy Ek is higher than the elastic energy threshold Ekref. In this case, the CPU determines as "No" in step 935 and goes to step 940.

In step 940, the CPU determines as to whether the crank angle CA is larger than the upper limit crank angle CAmax. If the crank angle CA is larger than the upper limit crank angle CAmax, the elastic energy Ek is lower than the elastic energy threshold Ekref. In this case, the CPU determines as "Yes" in step 940 and goes to step 235.

On the other hand, if the crank angle CA is the upper limit crank angle CAmax or less, the elastic energy Ek is higher than the elastic energy threshold Ekref. In this case, the CPU determines as "No" in step 940 and goes to step 240.

According to the control apparatus 64, by considering the lubrication oil temperature THO in addition to the crank angle CA of the internal combustion engine 23, the vibration suppression control with higher precision can be performed. As a result, vibration of the vehicle 10 and/or the occurrence of a noise can be avoided, and the delay of a torque change of the first motor 21 can be suppressed to the minimum.

While each embodiment of the control apparatus according to the present invention has been explained as described above, the present invention is not limited to these embodiments, and various modifications can be achieved unless the invention departs from its purpose. For example, in each embodiment, the control apparatus according to the present invention has been applied to a hybrid vehicle (vehicle 10) in which a motor and an internal combustion engine generate a vehicle driving force. However, the control apparatus according to the present invention may be applied to a gasoline vehicle that mounts an internal combustion engine that generates a vehicle driving force and a motor that performs motoring of the internal combustion engine (for example, cranking).

For example, the control apparatus 61 according to the first embodiment estimates elastic energy Ek based on the crank angle CA, and the control apparatus 63 according to the third embodiment estimates elastic energy Ek based on the crank angle CA and the motor angle MA. However, the control apparatus may estimate elastic energy Ek only based on the motor angle MA.

Further, a vibration suppression processing executed by the control apparatus 61 according to the first embodiment is performed when |ΔT1| having a correlation with an absolute value of the amount of change of the command torque T1 of the first motor 21 per unit time is larger than a predetermined difference threshold Tref. That is, the vibration suppression processing is performed in both cases where the first motor 21 generates a torque in the same direction as the rotational direction of the crankshaft of the internal combustion engine 23 and where it generates a torque in the opposite direction from the rotational direction of the crankshaft. However, the vibration suppression processing may be performed only in the case where the first motor 21 generates a torque in the same direction as the rotational direction of the crankshaft of the internal combustion engine 23. Alternatively, the vibration suppression processing may be performed only in the case where the first motor 21 generates a torque in the opposite direction from the rotational direction of the crankshaft of the internal combustion engine 23.

In addition, the control apparatus 61 refers to the map (FIG. 3) to estimate elastic energy Ek. However, in order to estimate the elastic energy Ek, the control apparatus 61 may respectively retain a map to be referred to when the first motor 21 generates a torque in the same direction as the rotational direction of the crankshaft of the internal combustion engine 23 and a map to be referred to when it generates a torque in the opposite direction from the rotational direction of the crankshaft, and determine a map to be referred to in accordance with the orientation of the torque generated by the first motor 21. Alternatively, the control apparatus 61 may respectively retain a map to be referred to when the internal combustion engine 23 starts the operation (for example, the driving mode is moved from the motor driving mode to the engine driving mode or the motor assist mode) and a map to be referred to when the internal combustion engine 23 stops the operation (for example, the driving mode is moved from the engine driving mode or the motor assist mode to the motor driving mode), and determine a map to be referred to in accordance with the operation state of the internal combustion engine 23.

What is claimed is:

1. A control apparatus for a vehicle including:
an internal combustion engine that generates a driving force; and
a motor connected to the internal combustion engine via an elastic body to allow torque transmission,
the control apparatus comprising:
an electronic control unit configured to perform a specific control that controls a rotational speed of the internal combustion engine by a generated torque of the motor, and
the electronic control unit ben configured to perform a control such that, even when a magnitude of the generated torque accompanied with releasing elastic energy accumulated in the elastic body in the specific control is required to be changed, the magnitude is not changed when an absolute value of a torque change ratio which is an amount of change per unit time of the generated torque of the motor is larger than a predetermined change ratio threshold and an absolute value of the elastic energy is larger than a predetermined elastic energy threshold.

2. The control apparatus according to claim 1, wherein the specific control is a control that lowers a rotational speed of the internal combustion engine by the generated torque of the motor, and the change is a change that reduces the generated torque.

3. The control apparatus according to claim 1, wherein the electronic control unit is configured to estimate the elastic energy based on a crank angle of the internal combustion engine.

4. The control apparatus according to claim 1, wherein the electronic control unit is configured to estimate the elastic energy based on a motor angle of the motor.

5. The control apparatus according to claim 1, wherein the electronic control unit is configured to set the elastic energy threshold to decrease as the absolute value of the torque change ratio increases.

6. A control method for a vehicle including:
an internal combustion engine that generates a driving force;
a motor connected to the internal combustion engine via an elastic body to allow torque transmission; and
an electronic control unit,
the control method comprising:
performing, by the electronic control unit, a specific control that controls a rotational speed of the internal combustion engine by a generated torque of the motor; and
performing, by the electronic control unit, a control such that, even when a magnitude of the generated torque accompanied with releasing elastic energy accumulated in the elastic body in the specific control is required to be changed, the magnitude is not changed when an absolute value of a torque change ratio which is an amount of change per unit time of the generated torque of the motor is larger than a predetermined change ratio threshold and an absolute value of the elastic energy is larger than a predetermined elastic energy threshold.

* * * * *